Aug. 1, 1933.    B. K. FORD ET AL    1,920,191
METHOD OF AND SYSTEM FOR IMPREGNATING ARTICLES
Filed June 6, 1930
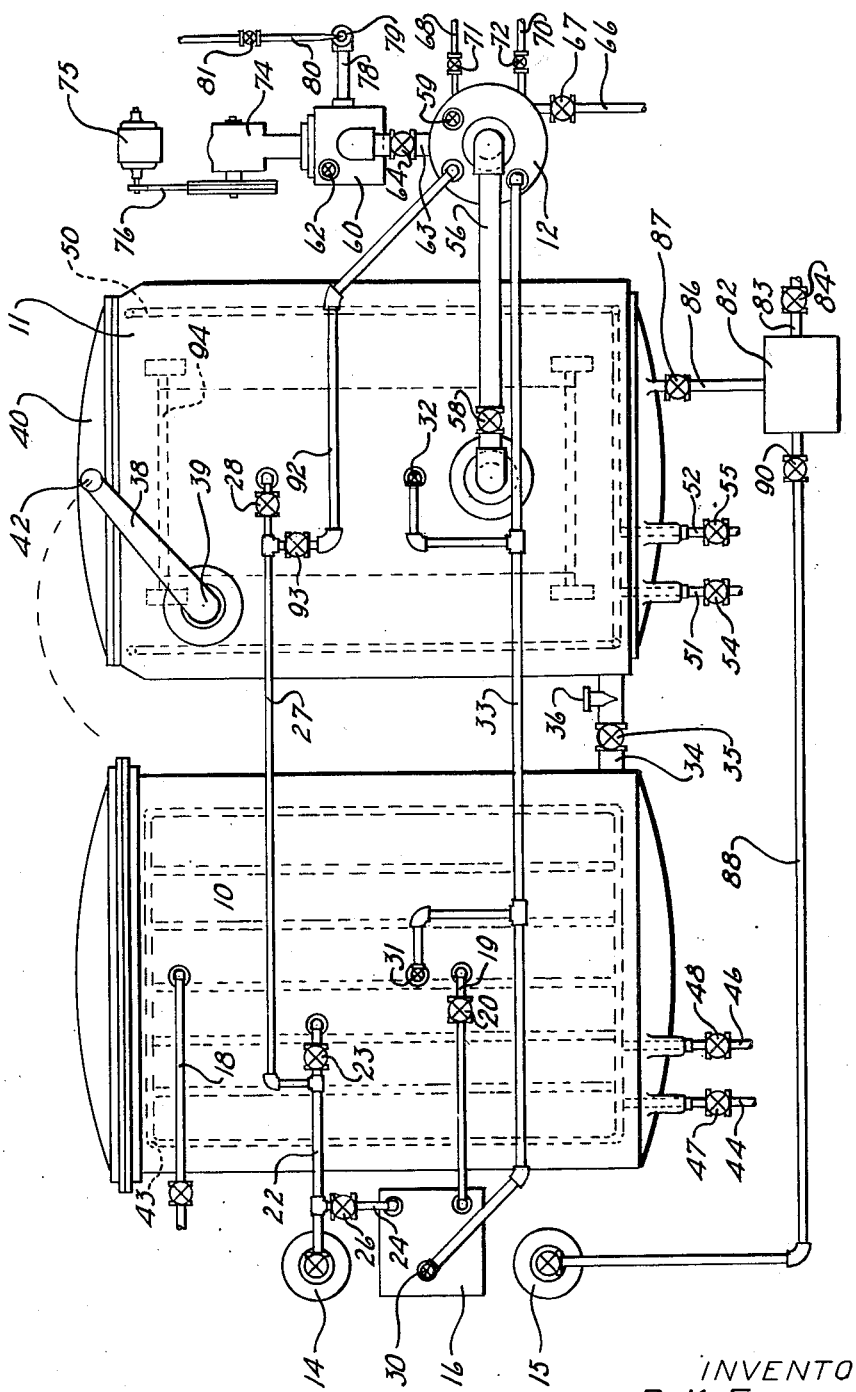
INVENTORS
B. K. FORD
M. A. LAMME
BY E.R. Nowlan
ATTORNEY Patented Aug. 1, 1933

1,920,191

UNITED STATES PATENT OFFICE 1,920,191

METHOD OF AND SYSTEM FOR IMPREGNATING ARTICLES

Ben K. Ford, Westfield, and Maurice A. Lamme, Maplewood, N. J., assignors to Western Electric Company, Incorporated, New York, N. Y., a Corporation of New York Application June 6, 1930. Serial No. 459,518

5 Claims. (Cl. 91—70.)

This invention relates to a method of and a system for impregnating articles, and more particularly to a method of and system for impregnating articles by means of a volatile solution.

An object of the invention is to provide a method of impregnating articles which will be safe, economical and efficient and a system therefor which will be safe, compact, flexible and efficient.

The invention concerns the impregnation of articles, such as telephone connecting cords, with a solution of waxes in a volatile vehicle, such as benzine. The system includes a benzine tank connected by a conduit to a storage tank, an impregnating tank connected to the storage tank, a condenser connected to the impregnating tank, a suction pump for evacuating the impregnating tank connected to the condenser, and a heater leading to the impregnating tank. The benzine, storage and impregnating tanks, and the condenser are connected to one of two tanks of a compressed inert gas, such as carbon dioxide, the other tank emptying through the heater. The volatile vehicle, whether alone or in solution with wax, is transferred from one to the other portions of the system under pressure of the inert gas; and the evaporation fumes of the vehicle are diluted with the gas prior to breaking the vacuum in the impregnating tank in order to prevent explosion or fire.

The invention will be more clearly understood by referring to the following detailed description, read in connection with the accompanying drawing, wherein the figure shows, in plan, a diagrammatic representation of a system whereby the invention may be practiced.

A mixing and storage tank 10 accommodates an impregnating fluid or solution of any desirable composition which, however, in a specific instance, consists of 25 lbs. carnauba wax and 25 lbs. paraffin wax as the impregnating body, and 100 gallons of benzine as a vehicle. In lieu of benzine, other solvents in the light petroleum distillate class may be used, such as petroleum ether; or solvents of the benzol group may be employed, such as benzol, toluol, or xylol. A tank 11 is provided for holding articles to be impregnated, and at the right thereof a condenser 12 is shown, for recovering vapors of the vehicle as they are drawn from the system in a manner to be hereinafter described.

To the left of the storage tank are compressed gas tanks 14 and 15, respectively, for holding charges of a highly compressed gas, such as carbon dioxide, nitrogen, helium, etc., which shall be inert with respect to the solution used. For large installations, a battery or manifold of tanks may be used in lieu of each tank, it being merely essential that the available pressure at each gas tank unit 14 and 15 be sufficient to perform the functions described herein. A tank 16 is provided to hold any desired quantity of the benzine prior to its introduction into the mixing or storage tank 10. A valve controlled conduit 18 leads into the storage tank 10 and constitutes a line of supply whereby the impregnating waxes may be conducted thereto. A conduit 19 extends from the vehicle tank 16 to the storage tank 10 and is provided with a cut-off valve 20 for controlling the passage of the benzine therethrough. A conduit 22 connects the compressed gas tank 14 with the storage tank and is provided with a cut-off valve 23 for controlling the flow or exudation of gas therethrough. A conduit 24 connects the vehicle tank 16 with the compressed gas tank 14 and is provided with a valve 26 for controlling the flow of gas therethrough. A conduit 27 connects the impregnating tank 11 with the gas tank 14 and is similarly controlled by a cut-off valve 28. The vehicle tank 16, storage tank 10 and impregnating tank 11 are provided with vent or relief valves 30, 31 and 32, respectively, to permit passage of accumulated volatile vapors therefrom through a common pipe 33 into the condenser 12. The storage tank 10 and the impregnating tank 11 are connected at the bottom of each by a solution conduit 34, controlled by a cut-off valve 35 and provided with an inspection glass 36 of any suitable type whereby it may be determined whether gas is passing from one to the other of the tanks 10 and 11.

The impregnating tank is provided with a rotatable arm 38, one end of which is pivoted to the tank 11 at 39. A tight fitting door 40 is pivotally mounted on the arm 38 at 42 and may be swung to close or open the impregnating tank, to permit insertion or removal of articles to be impregnated, by rotation of the arm 38. Any suitable sealing means may be provided to insure that the door 40 is closable in an airtight manner when the articles are being treated therein.

The storage tank 10 is provided at the bottom thereof with any desired number of steam coils 43 which are placed therein in order to heat the waxes and vehicle. A steam inlet pipe 44 and outlet pipe 46 connect with the coils 43 and are respectively controlled by cut-off valves 47 and 48. Hot water coils 50, of any desired extent, are disposed along the sides and rear of the impregnating tank 11 for the purpose of controlling the temperature therein, and are supplied by hot water inlet pipe 51 and return pipe 52, controlled by cut-off valves 54 and 55, respectively.

A vapor conduit 56 connects the impregnating tank 11 with the condenser 12 and is provided with a cut-off valve 58 for controlling the passage of vapors from the tank to the condenser. The condenser 12 is provided with an atmospheric vent 59 in order to permit, when desired, air to be drawn into the condenser. Immediately adjacent to the condenser is a suction box 60 of any suitable evacuating system and the suction box is provided with a suitable atmospheric vent or relief valve 62 for the purpose, at times, of permitting air to be drawn into the suction chamber 60. The condenser and suction chamber are connected by a vapor conduit 63 which is controlled by a cut-off valve 64. At the bottom of the condenser is fitted a drain 66 leading to a sewer or receptacle (not shown) and controlled by a cut-off valve 67 of any suitable type. It will be understood that the primary purpose of the condenser is to return to liquid form the vapors of the volatile liquid which are drawn from the impregnating tank by the suction system, and the vented fumes which are emitted from the remaining apparatus. To facilitate such action, the condenser is provided with a water cooling system including an inlet pipe 68 and an outlet pipe 70, the inlet and outlet pipes being respectively controlled by cut-off valves 71 and 72 which are normally open. A pump 74, driven from a conventional motor 75 by any suitable belting or other driving means 76, is provided for operating the suction device 60, and an exhaust 78, leading to an escape flue 79, is fitted to the suction chamber 60. Since it is possible that all vapors will not be condensed in the condenser 12 and to reduce the possibility that uncondensed vapors might combine with air of the surrounding atmosphere in an explosive ratio, a pipe 80, controlled by a cut-off valve 81, is introduced into the flue 79, connecting therewith a source of compressed air (not shown).

A heater 82 having an air intake conduit 83 controlled by a valve 84, is connected to the impregnating tank by means of a conduit 86. The conduit is provided with a suitable cut-off valve 87 for controlling the passage of air or gas therethrough. A conduit 88 controlled by a suitable cut-off valve 90 connects the heater 82 with the compressed gas tank 15 and renders it possible by appropriate manipulation of the described valves to substitute a flow of the inert gas through the heater in lieu of air. A conduit 92 connects the condenser 12 to the gas tank 14 and is provided with a cut-off valve 93 for controlling passage of gas therethrough. It will be understood that, aside from the valve and pipe fittings described herein, the storage tank and impregnating tank are so constructed as to be both liquid and airtight in order that loading and emptying of the tanks of liquid may be accomplished by fluid pressure, as hereinafter described.

The method described is specifically for the impregnation of finished telephone or switchboard cords with a solution of vegetable and mineral waxes in a volatile solvent or vehicle, and the later removal of the solvent, thereby leaving a waxy residue in the fibre of the articles as a moisture repelling agent. The waxes are previously melted and mixed together and then transferred into the storage tank through the conduit 18 in any convenient manner. Benzine is then transferred from the vehicle tank and added to the wax mixture within the storage tank by closing valve 30 and opening valves 26, 31 and 20, the pressure of gas from the tank 14 being sufficient to displace the benzine, which flows through the conduit 19 into the storage tank. By opening valves 47 and 48, steam is then circulated in the coils 43 which, being located at the bottom of the tank, cause a thorough mixing of the waxes and the solvent by convection or boiling action. As the temperature and activity of the solution within the tank increases, a portion of the solvent goes into vapor and escapes via the valve 31 and conduit 33 to the condenser. When the temperature of the solution reaches 170° F. valves 47 and 48 are closed and the solution permitted to settle at least one-half hour during which the valves 26, 20 and 31 remain closed.

While the solution is being prepared in the storage tank, truck 94 (shown in dotted lines) bearing the articles is placed in the impregnating tank, the door 40 tightly closed and the articles subjected to a preliminary drying in order to remove inherent or absorbed moisture therefrom. This is accomplished by turning valves 54 and 55 to cause circulation of hot water through the coils 50. The pump 74 is started and the atmospheric valves 59 and 62 closed. The vapor regulating valve 64 on the connecting conduit 63 is then slowly opened so as to bring the load on the pump gradually, until a vacuum of not less than 20 inches of mercury, or a negative pressure of 9.84 pounds, exists in the impregnating tank. When the temperature reaches 140° F. in the impregnating chamber, the circulating gas valve 87 is opened, the air inlet valve 84 to the heater 82 is also opened and the heater put in operation. It will be understood that the pump 74 is sufficiently powerful and the diameter of the conduits 56 and 63 sufficiently large with respect to the inlet conduit 86 that the atmosphere within the tank 11 is readily practically exhausted, this taking place despite the circulating current of air passing into the tank from the conduit 86. After a period of not less than one-half hour, during which the vacuum shall be kept at not less than 20 inches, and the temperature between 140 to 150° F., valves 58 and 64 are closed and the atmospheric air valve 62 of the suction box opened and the pump permitted to run approximately 5 minutes open to the atmosphere.

The solution valve 35 is then opened to permit the solution to pass from the storage tank to the impregnating tank. This is accomplished by opening the valve 23 in the storage chamber to admit the inert gas to flow from the tank 14 into the storage tank. In order to prevent the compression of evaporated fumes which accumulate in the tank 11 as the level of the solution rises therein, the vent valve 32 is opened. As soon as the gas is seen bubbling past the window 36 in the conduit 34, the valve 35 is closed as is the valve 23. Then the vent valve 31 in the storage tank is opened to permit escape of the gas and vapor fumes therefrom. The solution rises within the impregnating tank until the articles are entirely immersed in the solution. Impregnation shall continue for any desired length of time, and at the expiration thereof the impregnating tank is emptied of the solution by opening valve 28 between the impregnating tank and the gas tank 14 and opening valve 35. The pressure of gas through the conduit 27 is sufficient to force all of the unabsorbed residue of the solution back into the storage tank; and that the transfer has been completed may be readily determined by inspection at the window 36. Valves 35 and 28 are then closed and valve 31 of the storage tank closed. The articles are permitted to stand for one-half hour in a temperature of 140 to 150° F. after the solution has been removed. At the end of this period, the drippings which have collected on the floor of the impregnating chamber are forced back to the storage tank by again opening valves 28, 35 and 31. When the tank 11 has been entirely emptied, these valves are closed.

While the cords are dripping, the moisture condensate which collected in the condenser during the preliminary drying period is emptied to a sewer or suitable receptacle (not shown) for salvage, by opening the valve 67 and permitting escape of the condensate through the conduit 66. This is accomplished by opening valve 93 to permit the introduction of compressed gas into the condenser 12 through the conduit 92. When all the condensate has been expelled, valves 67 and 92 are closed.

Although, at this point the unabsorbed portion of the solution has been removed from the impregnating chamber, a considerable quantity of the volatile solvent is still held in the articles and special care must be taken to insure that this be removed before the articles are moved from the impregnating chamber into the room atmosphere. This is accomplished by opening the vapor valve 58. The pump 74 is then started and the valve 64 is gradually opened. By following this procedure, the load is taken up gradually, and the danger of absorbing the exhausted fumes into the pump is also lessened. The pump is permitted to run at full capacity with the valves 28, 32 and 87 closed, for a period of one and a half hours to insure the maintenance of maximum vacuity in the tank. The circulating air or gas valve 87 and the air inlet valve 84 are then opened to permit the circulation of heated air through the impregnating chamber by means of which the benzine in the cords is evaporated; and the vapor therefrom carried away through the vapor conduit 56 into the condenser where the major portion of the fumes are condensed and recovered. A vacuum of at least 20 inches and a temperature of 140 to 160° F. is maintained for at least one and one-half hours or until the rate of condensation has diminished to zero.

Preparatory to opening the impregnating chamber to remove the truck 94, air inlet valve 84 at the heater is closed and the valve 64 is closed. The vacuum in the impregnating tank is broken by opening the valve 90 to admit inert gas from the tank 15 into the heater 82, whence it passes through the circulating air valve into the impregnating tank. The atmospheric valve 62 is then opened to reduce the suction effect in the impregnating tank and the pump permitted to run for five minutes before shutting down. The flow of carbon dioxide through the heater gradually reduces the vacuum and when it has reached zero, the heating valves 54 and 55 are closed. The door of the impregnating tank may then be opened and the truck bearing the articles removed.

From the foregoing it will be observed that the process of impregnating articles may be carried out with a volatile solution even though the nature of the solution is such that the vapors therefrom tend to combine with the surrounding atmosphere in such a ratio as to form an explosive mixture. Transfer of the volatile solvent and solution is accomplished under pressure of an inert gas, thus preventing the formation of explosive mixtures within the system; and by treating the atmosphere after impregnation under a vacuum for drying while they are subjected to an influx of the inert gas, substantially all traces of the volatile solvent are removed from the articles before the vacuum is fully broken and they are brought out of the impregnating chamber into the ordinary atmosphere.

Although the foregoing description has particular reference to the impregnation of telephone connecting cords, it will be understood that it may be practiced with equal facility in the impregnation of any other type of articles which it may be desired to subject temporarily to any fluid; and that although certain values of temperature, time and pressure are given, said values are but convenient, forming no part of the invention, and may in a fitting case be readily altered as good practice shall dictate. It will be understood that the invention is capable of utility in various other forms and it is therefore desired that it not be limited to the particular embodiment but only as by the scope of the appended claims.

What is claimed is:

1. A method of impregnating articles, which comprises placing the articles in a closed impregnating chamber, raising the temperature in the chamber above 100° F., creating and maintaining a vacuum in the chamber for a predetermined period of time while maintaining the temperature above 100° F., and simultaneously admitting fresh air to the chamber, heating a mixture of an impregnating material and a volatile solvent in a closed storage tank, transferring the heated mixture from the storage tank to the impregnating chamber by an inert gas under pressure, maintaining the solution in the impregnating chamber for a predetermined period of time to impregnate the articles, transferring the solution from the impregnating chamber back to the storage tank by an inert gas under pressure, exhausting the vapor from said impregnating chamber, maintaining a vacuum in the impregnating chamber for a predetermined period of time and simultaneously maintaining the temperature above 100° F., and admitting heated fresh air to the impregnating chamber while maintaining the vacuum and the temperature above 100° F. for a predetermined period of time.

2. A method of impregnating articles, which comprises placing the articles in an impregnating chamber, creating and maintaining a vacuum in the chamber for a predetermined period of time while maintaining the temperature therein above 100° F., heating a mixture of an impregnating material and a volatile solvent in a closed storage tank to a temperature above 100° F., transferring the mixture from the storage tank to the impregnating chamber by an inert gas under pressure for impregnating the articles, transferring the solution from the impregnating chamber back to the storage tank by an inert gas under pressure, allowing the impregnating compound to drain from the articles, while maintaining the temperature above 100° F., creating and maintaining a vacuum in the impregnating chamber for a predetermined period of time and simultaneously maintaining the temperature above 100° F., admitting heated fresh air to said impregnating chamber while maintaining the vacuum and the temperature above 100° F., and admitting an inert gas to said impregnating chamber to break the vacuum.

3. A method of impregnating articles, which comprises placing the articles in an impregnating chamber, sealing the chamber, raising the temperature in the chamber above 100° F., exhausting the air from the chamber, maintaining a pressure below a ten inch vacuum in the chamber for more than one-half hour while maintaining the temperature above 100° F., admitting fresh air to said chamber for more than one-half hour while maintaining the vacuum pressure below a ten inch vacuum and the temperature above 100° F., preparing a mixture of an impregnating material and a volatile solvent in a closed storage tank, boiling said mixture at a temperature above 100° F., transferring the mixture from the storage tank to the impregnating chamber by an inert gas under pressure and simultaneously exhausting air from said impregnating chamber into a condenser, maintaining the solution in the impregnating chamber for a predetermined period of time to impregnate the articles, transferring the solution from the impregnating chamber back to the storage tank by an inert gas under pressure and simultaneously exhausting the gas from said storage tank into the condenser, allowing the impregnating compound to drain from the articles for at least 15 minutes while maintaining the temperature above 120° F., transferring the drippings from said articles to said storage tank by means of an inert gas under pressure, exhausting the vapor from said impregnating chamber into a condenser, maintaining a vacuum in the impregnating chamber for at least one-half hour and simultaneously maintaining the temperature above 120° F., admitting heated fresh air to said impregnating chamber while maintaining the temperature above 120° F. and the pressure below a ten inch vacuum for at least one-half hour, and admitting an inert gas to said impregnating chamber to break the vacuum.

4. In a system for impregnating articles, an impregnating chamber for the articles having an air tight door for inserting and removing the articles, means for maintaining a temperature above 100° F. therein, means for maintaining a vacuum in said impregnating chamber, a storage tank for an impregnating solution, means for heating the impregnating solution in said storage tank above 120° F., means for introducing an inert gas under pressure into said storage tank to force the impregnating solution into said impregnating chamber to cover said articles, means for introducing said inert gas under pressure into said impregnating chamber for forcing the impregnating compound back into the storage tank, a condenser, means for exhausting the vapor from said impregnating chamber into the condenser after the impregnating compound has been removed therefrom and before the impregnated articles are removed therefrom.

5. In a system for impregnating articles, an impregnating chamber for the articles, means for maintaining a vacuum in said impregnating chamber, a storage tank for an impregnating solution, means for heating the impregnating compound in said storage tank above 120° F., means for introducing an inert gas under pressure into said storage tank to force said impregnating solution into said impregnating chamber, means for introducing an inert gas under pressure into said impregnating chamber for forcing the impregnating compound back into the storage tank, means for maintaining a temperature in said impregnating chamber above 100° F., a condenser, means for exhausting the air and vapor from said impregnating chamber into the condenser, means for admitting fresh air to said impregnating chamber while simultaneously maintaining a vacuum therein, means for exhausting the vapor from said storage tank to said condenser, and means for admitting heated inert gas to said impregnating chamber to break the vacuum therein.

BEN K. FORD.
MAURICE A. LAMME.